C. A. FEWELL.
FRICTION OPERATED DASHER FOR CHURNS.
APPLICATION FILED OCT. 26, 1910.
979,274.
Patented Dec. 20, 1910.
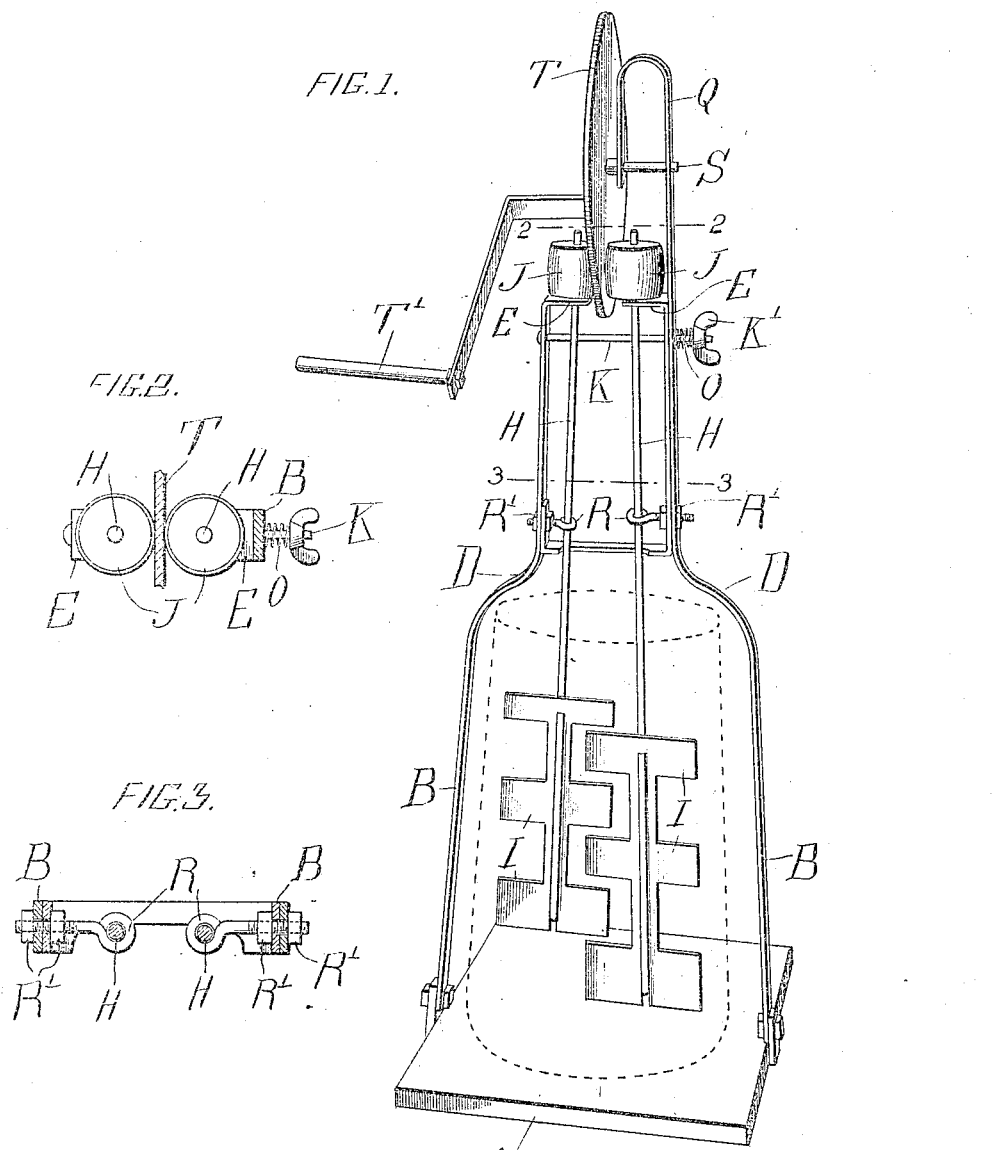
WITNESSES:
INVENTOR
C. A. Fewell,
BY Franklin N. Hough
Attorney

UNITED STATES PATENT OFFICE.

CICERO ALEXANDER FEWELL, OF GLENWOOD, ARKANSAS.

FRICTION-OPERATED DASHER FOR CHURNS.

979,274. Specification of Letters Patent. Patented Dec. 20, 1910.

Application filed October 26, 1910. Serial No. 589,164.

*To all whom it may concern:*

Be it known that I, CICERO A. FEWELL, a citizen of the United States, residing at Glenwood, in the county of Pike and State of Arkansas, have invented certain new and useful Improvements in Friction-Operated Dashers for Churns; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in friction operated dasher apparatus for churns and comprises a simple and efficient device of this nature having various details of construction and combinations and arrangements of parts which will be hereinafter fully described and then specifically defined in the appended claims.

My invention is illustrated in the accompanying drawings, in which:—

Figure 1 is a perspective view of a churning apparatus made in accordance with my invention. Fig. 2 is a cross sectional view on line 2—2 of Fig. 1, and Fig. 3 is a section on line 3—3 of Fig. 1.

Reference now being had to the details of the drawings by letter, A designates the base of the apparatus which may be a board or other object and hinged thereto are the upright bars B which are curved toward each other at locations, designated by letters D, and have upright portions parallel to each other which, at the points E, are bent at angles toward each other. Each of the upper inwardly bent ends is apertured to form a bearing for the upper portion of a vertically disposed rotatable shaft H having dasher wings I thereon. A bolt K is passed through registering apertures in the upright bars B and has a thumb nut K' upon the threaded end thereof and interposed between said nut and one of the bars B is a coiled spring O adapted to bear frictionally intermediate the nut and the bar. By the provision of said bolt, the two bars B may be adjusted different distances relative to each other for the purpose of increasing or decreasing the frictional action of the apparatus.

Eye bolts, designated by letters R, pass through the bars B and the eyes of said bolts serve as bearings for the dasher shafts H. Nuts R' upon the bolts R upon either side of the bars B serve as means for adjusting said bolts R longitudinally to bring the dashers nearer to or farther from each other.

In the drawings the dashers are shown as having wings which are alternately arranged one to another and adapted, without interference, to rotate in the manner shown.

A bar Q has apertures to receive the shank portion of one of the eye bolts R and also the bolt K and its upper end is bent upon itself and is apertured to form a bearing for one end of the axle S, which axle is also journaled in an aperture in the shank portion of the bar Q. A disk T is fixed to said axle and has a crank handle T' for rotating the same.

Friction wheels or rollers, designated by letters J, are fixed to the upper ends of the two dasher shafts and are adapted to frictionally engage the opposite faces of the disk, the tension of said rollers or wheels against the disks being regulated by the thumb screw K'. Said friction rollers are preferably covered with paper or other fabric suitable for the purpose for which they are intended.

By the provision of a frictionally operated dasher apparatus for churns as shown and described, it will be noted that a simple and efficient device is afforded which may be applied to churns of different sizes. The dashers being placed in the churn resting upon the platform, the upright bars may be connected to the latter and, when desired, the frame of the apparatus may be thrown back to a horizontal position by reason of the hinged connection with the platform.

What I claim to be new is:—

1. A friction actuated dasher apparatus for churns comprising an upright frame, dasher shafts journaled therein, friction rollers fixed to said shafts, a rotatable friction disk movable between the friction wheels, means for adjusting the latter, and means for moving the dashers upon the shafts toward or away from each other.

2. A friction actuated dasher apparatus for churns comprising upright bars, their inner ends forming bearings, eye bolts carried by said bars, dasher shafts having bearings in apertures in said bars and said eye bolts, the latter being adjustable, friction rollers fixed to said shafts, a friction disk rotatable between the friction rollers, and means for adjusting said rollers to increase or diminish the friction intermediate the rollers and disk.

3. A friction actuated dasher apparatus for churns comprising upright bars, their inner ends forming bearings, eye bolts carried by said bars, dasher shafts having bearings in apertures in said bars and said eye bolts, the latter being adjustable, friction rollers fixed to said shafts, a friction disk rotatable between the friction rollers, a bolt passing through upright portions of the frame, a threaded nut upon the same, a spring interposed between the nut and frame and serving to regulate the friction rollers.

4. A friction actuated dasher apparatus for churns comprising upright bars and base to which they are hinged, the upper ends of the bars turned toward each other and apertured, eye bolts in said bars, dasher shafts journaled in the eyes of said bolts and the apertures in the inwardly turned ends of the bars, friction rollers fixed one to each shaft, a bar having a bowed portion and an axle journaled in the latter, friction disks fixed to said axle, and a crank for rotating the disk.

In testimony whereof I hereunto affix my signature in the presence of two witnesses.

CICERO ALEXANDER FEWELL.

Witnesses:
JOHN J. HUGHES,
B. P. THRASH.